(No Model.)　　　　　　　　　　　　　　　　2 Sheets—Sheet 1.
F. R. SMITH.
DUMPING CART.
No. 590,242.　　　　　　　　　　Patented Sept. 21, 1897.
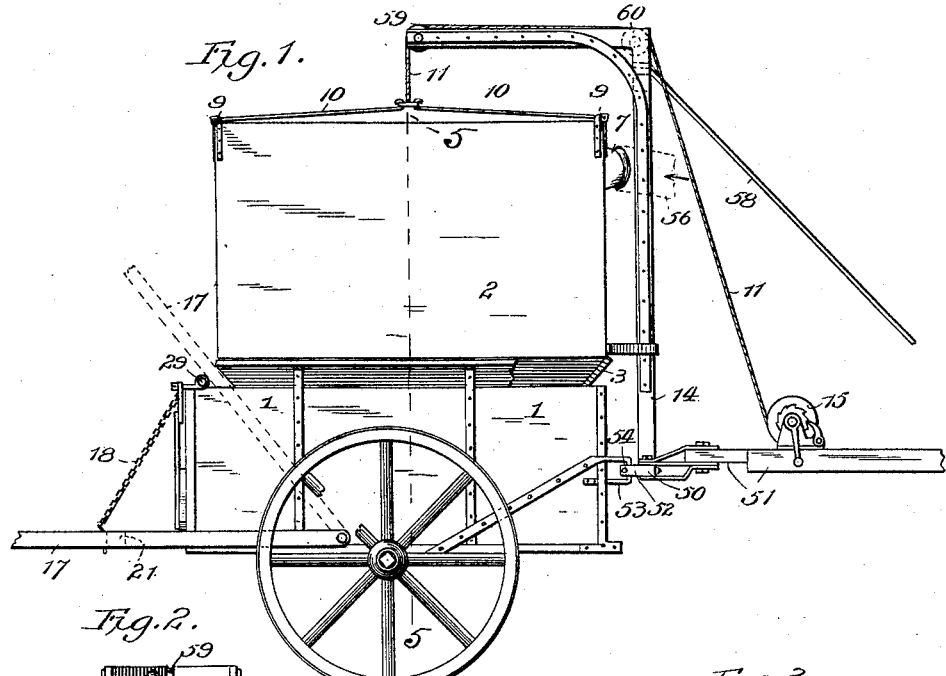
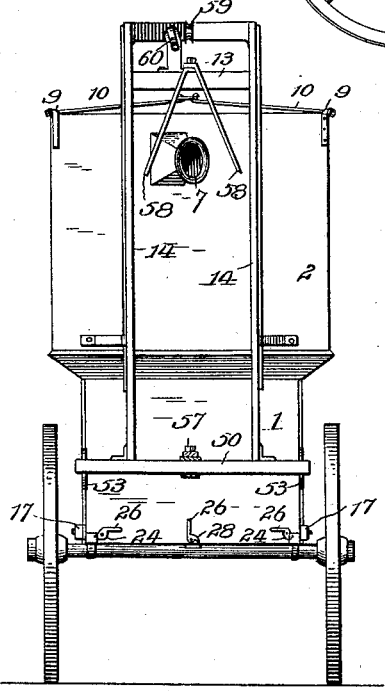
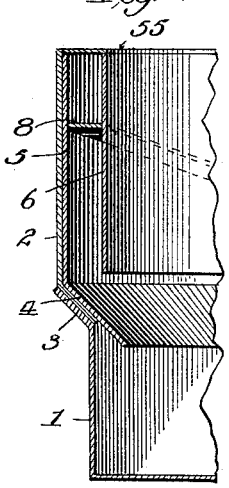
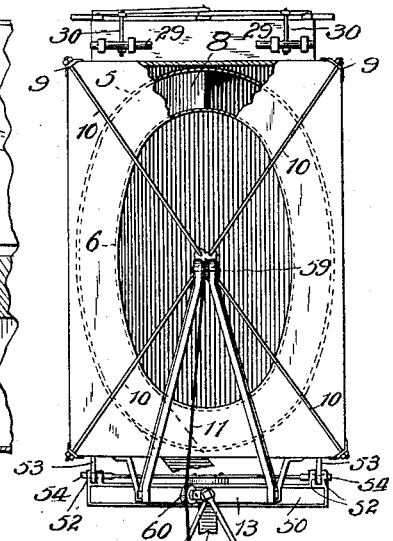
WITNESSES:　　　　　　　　　　　　　　INVENTOR
*Harry S. Rohrer*　　　　　　　　　　　*F. R. Smith*
*Wallace Treene*　　　　　　　　　BY
　　　　　　　　　　　　　　　　*Chas. W. Lincoln*
　　　　　　　　　　　　　　　　　ATTORNEY.

(No Model.) 2 Sheets—Sheet 2.
F. R. SMITH.
DUMPING CART.
No. 590,242. Patented Sept. 21, 1897.
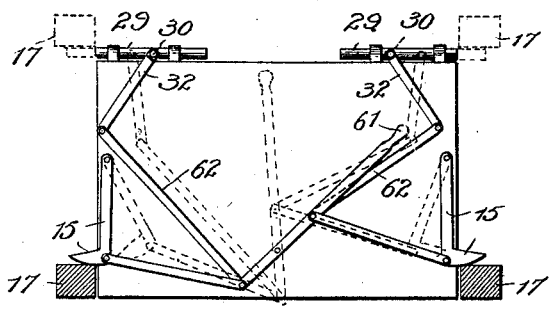
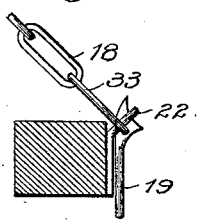
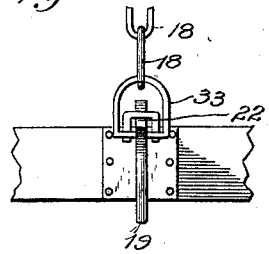
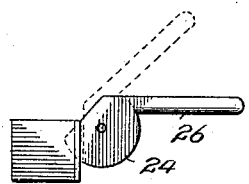
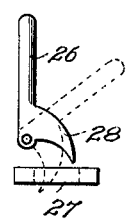
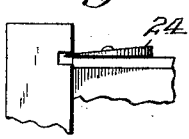
WITNESSES:
Harry S. Rohrer
Wallace Greene
INVENTOR
F. R. Smith
BY
Chas. P. Lincoln
ATTORNEY.

UNITED STATES PATENT OFFICE.

FRED R. SMITH, OF OMAHA, NEBRASKA, ASSIGNOR TO THE CYCLONE STREET CLEANER, OF SAME PLACE.

DUMPING-CART.

SPECIFICATION forming part of Letters Patent No. 590,242, dated September 21, 1897.

Application filed January 11, 1896. Serial No. 575,173. (No model.)

*To all whom it may concern:*

Be it known that I, FRED R. SMITH, residing at Omaha, county of Douglas and State of Nebraska, have invented certain new and useful Improvements in Dumping-Carts; and I do hereby declare that the following is a full, clear, and exact description of the invention, such as will enable others skilled in the art to which it appertains to make and use the same, reference being had to the accompanying drawings, which form a part of this specification.

The invention relates to dumping-carts adapted to receive blast-driven materials gathered by a street-cleaning machine, also to devices whereby the cart is held in coöperative relation with such machine, and to various novel features, hereinafter described, pertaining to such cart and devices.

The general object of the invention is to provide for delivering the gathered material in a dump-cart detachably connected with the cleaning-machine and normally traveling with it until filled, the cart when filled being quickly replaceable by an empty one, to be filled in turn.

In the drawings, Figure 1 is a side elevation of the cart and a small portion of a cleaning-machine. Figs. 2 and 3 are respectively rear and top views of the same apparatus. Fig. 4 is a front view of the cart-body. Fig. 5 is a partial section on the line 5 5, Fig. 1. Figs. 6 and 7 are enlarged views of a certain chain-fastening. Figs. 8 and 9 are details of the end-gate fastening. Fig. 10 is a bottom plan of the devices of Fig. 8.

In the drawings, 1 represents the rectangular body of a two-wheeled cart provided with a hopper 3. For detachably connecting the cart to the cleaning or sweeping machine a cross-bar 50 is centrally pivoted to a rigid rearwardly-extending projection 51 from the machine-frame, and near the ends of this cross-bar are rearwardly-projecting lugs 52 in position to overlap and lie contiguous to loops 53, projecting at the sides of the rear end of the cart-body. The cart being backed up so as to bring the loops in proper position, bolts 54, working in transverse perforations in the lugs, are passed through the loops and the cart is thus securely attached, but in such manner as to permit relative swinging of the two machines both horizontally and vertically.

2 is a rectangular receiving-box provided below with a funnel-formed hopper 4, which fits within and rests loosely upon the hopper 3. Within this box 2 is an oval cylinder 5, to which preferably the four sides of the box are tangent and which terminates below in a funnel-form portion, to which the sides of the hopper 4 are tangent. Within the wall 5 is an oval cylinder 6, pendent from the top 55 of the receiving-box 2 and extending downward to a point somewhat above the lower limit of the non-converging portion of the cylinder 5. The annular space between the walls 5 6 is not greater in cross-sectional area than the space within the wall 6, but may be made equal to it, the comparative area being of importance because air enters the cart through the annular space and passes out through the central space, as will presently be explained in detail, and its velocity of exit should be low in order that it shall not carry out dust.

Preferably at the rear of the cart and near the top of the box a short tube 7 passes inward to the annular space, entering it tangentially and serving to deliver in the annular space the material collected by the sweeper or cleaning machine and carried by an air-blast through a flexible tube 56, attached to the tube 7. Just below the tube 7 in the annular space there is a partition 8, extending from the wall 6 to the wall 5 and passing in the direction of the blast obliquely downward about half around the inner cylinder. As the air enters with high velocity through the tube 7 it is not practicable to have it discharge directly into the cart. The partition prevents this and forces the air and dirt to pass around the inner cylinder in a space continually increasing in sectional area, so that it loses a great part of its velocity before it turns downward into the cart to deposit the material which it carries. Once in the cart, as it can escape only through the central space inclosed by the wall 6, it must reverse its entering direction. Thus practically all its initial velocity is lost and it escapes with a velocity due only to the pressure throughout the whole interior of the cart, caused by the entering air. Since the area of this exit is many times that of the inlet-tube, the outward velocity is never sufficient to lift and carry out a material amount of dust.

Upon the cross-bar 50 is rigidly mounted a crane for lifting the box 2 when the cart, being filled, is to be detached and replaced by another and similar one. This crane consists of two members 14, which pass up to some distance above the box 2 and then extend horizontally to a point vertically above the middle of the box, where they meet. Near the top the upright portions of the two members 14 are connected by a rigid member 13, and upon this and in a vertical line with the pivot 57 of the cross-bar 50 below are pivoted the ends of guy-rods 58, which extend downwardly forward and are secured to the cleaning-machine.

To the upper corners of the box 2 are attached loops 9, and to these are connected diagonal rods 10, which meet over the middle of the box. To them at their meeting-point is secured a wire rope 11, which passes vertically upward over a pulley 59 at the end of the crane, over a pulley 60, near the vertical portion of the latter, and thence obliquely to a drum 15, mounted upon the cleaning-machine projection 51 and provided with suitable devices whereby it may be rotated. Obviously proper rotation of the drum lifts the receiving-box 2, and when this has been raised clear of the cart the latter may be detached and replaced by another, and the box 2 being again lowered the apparatus is again ready for use.

As the cart is drawn rearward behind the advancing sweeper provision is made for holding the thills 17 of the cart elevated. The thills are pivoted to the sides of the cart near the axle, so that they may swing upward, as shown in dotted lines in Fig. 1, and since they are pivoted provision must also be made for preventing both forward and backward dumping of the cart when detached from the sweeper, which during attachment prevents both. Upon the front end of the cart is pivoted a hand-lever 61, whose arms are connected by links 62 32 and rods 30 to sliding bolts 29 upon the top of the body 1 in such manner as to throw the bolts oppositely beneath the thills when raised. The lever-arms are also connected in like manner with stops 15, the arrangement being such that when the bolts are thrown out the stops are drawn far within the planes of the side walls of the cart, and as the bolts are retracted the thills are released before the stops project beyond those planes, although further movement of the lever projects them across the path of the thills. It follows that the bolts being sufficiently retracted to release the thills the latter may be lowered and afterward the stops may be projected. If now a horse support the thills in the usual manner, the stops resting upon the thills prevent forward dumping. By means of a chain 18, secured to the upper part of the body 1 and detachably attached at the other end to a cross-bar 21 of the thills rearward dumping is also guarded against. The specific device for attaching the chain is shown in Figs. 6 and 7. The last link 33 of the chain 18 passes through an eccentric lever-hook 19, the point of which is engaged in a rigid oblique loop 22, fixed to the cross-bar when the chain is to be attached, and the lever is then swung down against the front side of the cross-bar. In so swinging it carries the link 33 over the loop 32 to the position illustrated. Now owing to the eccentricity of the lever strain upon the chain draws the lever against the cross-bar, but has no tendency to swing it out of position, as it must swing if the chain is to be released. By taking hold of the lower end of the lever, however, it is readily swung out and upward, disengaging itself and the link from the loop.

The rear end of the cart is provided with an end-gate hinged at the top and shutting closely against the ends of the sides and bottom. To secure it and to press it firmly against said ends and make even a water-tight joint therewith, I employ wedges 24 28, pivoted on the end-board and rotated by levers 26, Figs. 8, 9, and 10. The wedges 24 are segmental and in one position lie wholly within the marginal lines of the end-board, but when rotated the thin portion of the wedge enters again in the projecting side sill of the body and closes the end-gate with great force. The other wedge is different in form, but it acts similarly in entering a suitable loop 27.

What I claim is—

1. The combination with a rigid projection from the frame of a street-sweeper, of a dump-cart, means for detachably securing said cart to said projection, a receiving-box resting upon and opening into the cart-body, a crane carried by said projection and extending over said receiving-box, and means for raising the receiving-box clear of the cart and holding it suspended from the crane.

2. The combination with a rigid projection from the frame of a street-sweeper, of a cross-bar centrally pivoted upon said projection to swing horizontally, a crane rigidly mounted upon said cross-bar to swing with it, and a dust-receiving box adjustably suspended from the crane-arm.

3. The combination with a rigid projection from a street-sweeper frame, of a cross-bar centrally pivoted upon said projection to swing horizontally and provided with devices adapted to engage projections upon a dump-cart and form a hinge-like connection therewith.

4. The combination with a dump-cart body of a dust-receiving box adapted to fit into the top of said body, an annular chamber formed within said box, closed above, opening below into said body, and provided with an opening to admit a dirt-laden air-blast, and a passage leading upward from the interior of the body to the open air.

5. The combination with a dumping-cart body, of a receiving-box riding thereon and provided with an inlet-tube near the top, and a chamber forming within the box a gradually-enlarging continuation of the tube and having at the end opposite said tube open communication with the space within said body.

6. The combination with a two-wheeled dump-cart, of thills pivoted upon the sides of the cart-body, a pivoted lever at the front of said body, stops adapted to be thrown out from the body over the thills when in normal position, bolts adapted to be thrown out from the body beneath the thills when in raised position, and devices connecting said lever to said stops and bolts to simultaneously actuate both as the lever is swung upon its pivot.

7. In a dumping-cart the combination of a lower box, a hopper mounted on it, a top box mounted on a hopper, an outer lining on said top box, an inner lining and the annular space between said outer and inner lining terminating in a stub-spout, all as and for the purpose set forth.

In testimony whereof I affix my signature in the presence of two witnesses.

FRED R. SMITH.

Witnesses:
JAMES H. WINSPEAR,
SAMUEL Y. SANSOM.